April 5, 1949.     E. P. SPAINE     2,466,500
LATCH OPERATED CLUTCH
Filed July 16, 1945
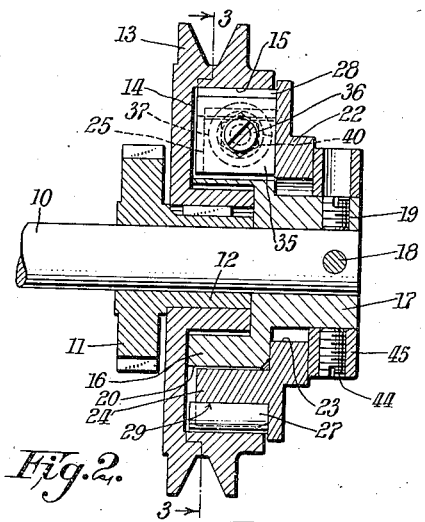
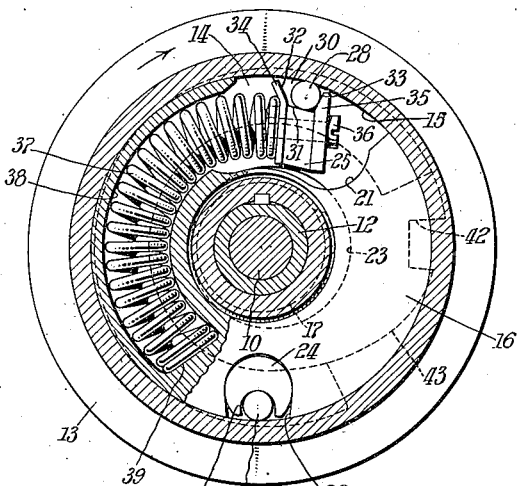
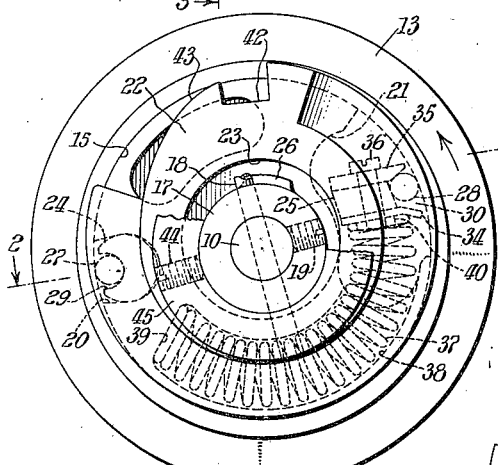
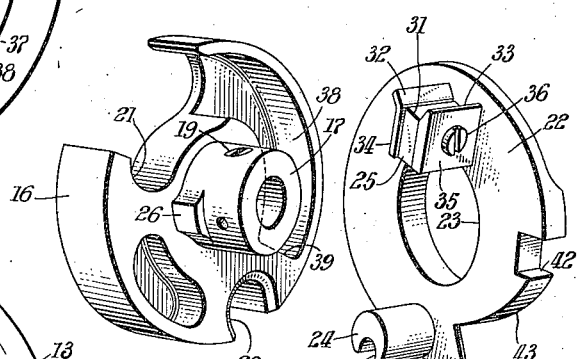
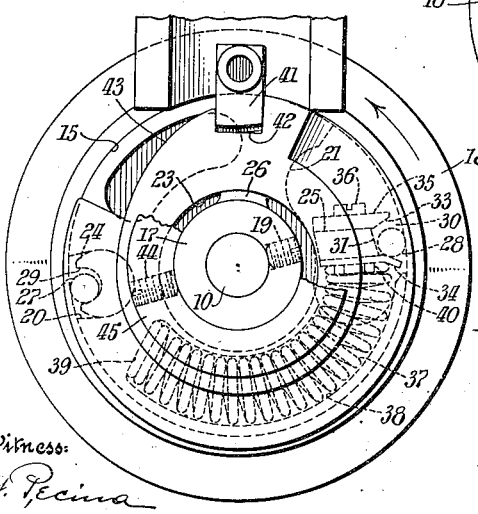
Inventor
Edward P. Spaine
By William P. Stewart
Attorney Patented Apr. 5, 1949

2,466,500

UNITED STATES PATENT OFFICE 2,466,500

LATCH OPERATED CLUTCH

Edward P. Spaine, Bridgeport, Conn., assignor to The Singer Manufacturing Company, Elizabeth, N. J., a corporation of New Jersey Application July 16, 1945, Serial No. 605,245

7 Claims. (Cl. 192—27)

This invention relates to clutches and particularly to that type of clutch used extensively in buttonhole sewing machines which are designed to make a predetermined number of revolutions and are then brought to a definite stop position. A machine of the type in question is disclosed in the U. S. patent of E. B. Allen, No. 863,129, Aug. 13, 1907, in which patent is illustrated the specific form of clutch upon which the present invention is an improvement.

In the prior construction, it was customary to employ only one clutch-element to connect or disconnect the belt-driven driving pulley and the main-shaft of the machine. When using only one clutch-element, the driving pulley is clutched to the main-shaft by a separating action of the clutch components, which separating action results in the forcing of the hub-bore of the driving pulley into frictional engagement with the periphery of the main-shaft. As a result of the difference in the distances from the center of the main-shaft to the periphery of the main-shaft and to the clutch-face on the driving pulley, slippage sometimes occurs between the main-shaft and the pulley-hub-bore engaging the shaft. This slippage results in the generation of heat sufficient to cause the driving pulley to seize on the main-shaft and, frequently, also to cause the main-shaft to "run-up" in its adjacent bearing.

It is therefore the primary object of the present invention to provide a clutch of the type in question designed to eliminate the slippage between the driving pulley and the main shaft when the clutch-elements are in wedging relation.

Another object of the invention is the provision of a clutch which remains in declutched condition during any slight rebound of the mechanism resulting from the sudden stopping thereof.

Other objects of the invention and the features employed to accomplish such objects will be apparent when the following description is considered in connection with the accompanying drawings.

In the drawings:

Fig. 1 is an end elevational view of the clutch in effective driving position, with the retainer-collar broken away to expose certain of the details of the clutch.

Fig. 2 represents a sectional view taken substantially along the line 2—2, Fig. 1.

Fig. 3 represents a vertical sectional view taken substantially along the line 3—3, Fig. 2.

Fig. 4 is an end elevational view similar to Fig. 1, but with a portion of the stop-mechanism of the sewing machine in position to effect a declutching of the driving belt-pulley.

Fig. 5 is a perspective view of the driven element of the clutch.

Fig. 6 is a perspective view of the driving element of the clutch.

Referring to the drawings which illustrate a preferred embodiment of the invention, the clutch assembly is shown as mounted on a sewing machine main-shaft 10. Freely journaled on the main-shaft 10 is a gear 11 of which the extended hub-sleeve 12 has keyed thereon a belt-driven driving pulley 13. Formed in a side face of the pulley 13 is an annular recess 14 providing an internal concentric cylindrical clutch-face 15. Disposed within the recess 14 is a driven clutch-member 16 having a hub 17 secured on the main-shaft 10, preferably by means of a taper-pin 18 and a set-screw 19. As shown in Fig. 5, the driven clutch-member 16 is formed with a segmental slot 20 and a clearance cut-out 21. Disposed in face-to-face relation with the driven clutch-member 16 is a clutch-element-carrying member or clutch-ring 22 having a centrally located clearance-hole 23 through which projects the hub 17 of the driven clutch-member 16. Projecting from the inner face of the clutch-ring 22 is a fulcrum-lug 24 and an abutment-lug 25. The fulcrum-lug 24 extends into, and is embraced by the sides of, the segmental slot 20 in the driven clutch-member 16, while the abutment-lug 25 extends into the clearance cut-out 21. When the driven clutch-member 16 and the clutch-ring 22 are thus assembled, the clutch-ring is adapted to pivot slightly about the fulcrum-lug 24 relative to the driven clutch-member 16; the extent of relative movement being determined by the difference in sizes of the clearance-hole 23 and the hub 17. To prevent excessive pivotal bodily movement of the clutch-ring 22, the driven clutch-member hub 17 is formed with a stop-abutment 26, clearly shown in Fig. 5.

To provide for connecting the driven clutch-member 16 to the driving clutch-member or pulley 13, I have employed two clutch-elements or cylinders 27 and 28 which are positioned opposite each other substantially diametrically of the clutch-ring 22. The clutch-cylinder 27 is located in a half-round cavity 29 extending lengthwise of, and opening into, the periphery of the fulcrum-lug 24, whereby the clutch-cylinder, when located in said cavity, can engage the internal cylindrical clutch-face 15 of the driving clutch-pulley 13.

The other clutch-cylinder 28 is disposed in a second cavity 30, the bottom of which is defined by the inclined outer end-surface 31 of the abutment-lug 25 and the sides of which are defined by the extended inclined faces 32 and 33 of two plates 34 and 35 secured, preferably by the screw 36, to the opposite sides of the abutment-lug.

The two clutch-cylinders 27 and 28 are normally urged into clutching or wedging relation between the clutch-ring 22 and the driving clutch-member or pulley 13 by a relatively strong coil-spring 37 positioned in a curved spring-receiving chamber 38 formed in the driven clutch-member 16. As clearly illustrated in Fig. 3, one end of the coil-spring 37 rests against the closed end 39 of its chamber 38 and the other end bears against the abutment-lug 25 of the clutch-ring 22. To prevent accidental displacement of that end of the spring 37 contacting the abutment-lug 25, the last convolution of the spring is preferably sized to embrace a nut 40 threaded upon the screw 36. It will be obvious from the drawings that the coil-spring acts between the driven clutch-member 16 and the clutch-ring 22, and that through the coil-spring, these two components of the clutch are urged apart about the fulcrum-lug 24.

As illustrated in Fig. 4, the clutch-cylinders 27, 28 are disposed at substantially diametrically opposite sides of the pulley clutch-face 15 when said clutch-cylinders are in the clutch-release position in which they are held by a stop-motion plunger 41 disposed in a stop-notch 42 provided in the periphery of the clutch-ring 22. Upon withdrawal of the plunger 41 from the stop-notch 42, the released clutch-ring 22 is free to swing about the fulcrum-lug 24, thereby positioning the clutch-cylinders 27 and 28 off-center or out of diametrical relation with respect to the clutch-face 15 of the pulley, as illustrated in Fig. 1 of the drawings. This results in wedging the clutch-cylinders 27, 28 against the pulley clutch-face 15 and in thereby inducing rotation of the clutch-member 16 with the pulley 13 in the direction of the arrow shown in Fig. 1. As the driving action of the pulley 13 is transmitted through the clutch-cylinders 27 and 28 to the clutch-member 16 at opposite sides of the pulley, binding of the pulley-hub-bore on the main-shaft is thereby eliminated.

When it is desired to interrupt the driving relationship between the belt-pulley 13 and the shaft 10, the automatically operated spring-depressed stop-motion plunger, indicated generally as 41 in Fig. 4, is adapted to enter the stop-notch 42 formed in the clutch-ring 22. When this occurs, the coil-spring 37 is compressed and the clutch-ring 22 pivots, in a clockwise direction (Fig. 4), about its fulcrum-lug 24 relative to the driven clutch-member 16 and into a position determined by the stop-abutment 26. With the parts in this position, the clutch-cylinders 27 and 28 have been shifted into a location in which wedging action cannot occur. When the clutch-cylinders 27 and 28 are in non-wedging position, as shown in Fig. 4, rotation of the declutched pulley 13 causes the clutch-cylinders to rotate in their respective cavities. This rotation of the clutch-cylinders is effective to change the wedging surface on the cylinders, thus distributing the wear about the entire periphery of the cylinders.

As is fully explained in the above mentioned U. S. Patent No. 863,129, that portion of the periphery of the clutch-ring 22, in advance of the stop-notch, is formed with a cam-rise 43 which is utilized to elevate the stop-motion plunger so that the same can drop into the stop-notch 42 when the usual stop-motion lever is tripped to stop the machine. The action of the cam-rise 43, in elevating the stop-plunger 41, effects a braking action on the machine, which results in easing the blow of the clutch-ring 22 against the stop-plunger 41. The shock of suddenly stopping the machine is absorbed by the coil-spring 37. To prevent the accidental reclutching of the driving pulley 13 with the main-shaft 10 during any rebound which might occur from the sudden stopping of the machine, the outer end-surface 31 of the abutment-lug 25 is inclined. The inclination of this surface or seat provides clearance for the clutch-cylinder 28, see Fig. 4, which clearance is sufficient so that the clutch-elements 27 and 28 cannot enter into wedging relation between the cylindrical clutch-face 15 of the driving pulley 13 and the clutch-element-carrying member 22, in view of the small amount of relative shift between the driven member 16 and the clutch-element-carrying member 22 resulting from the rebound. Moreover, the inclination of the seat 31 is effective to lessen the starting load shock. Referring to Fig. 4, it will be appreciated that when the stopping mechanism is first released, the clutch-ring 22, under the influence of the coil-spring 37, swings about the fulcrum-lug 24, causing the clutch-cylinder 28 to engage the cylindrical clutch-face 15. The initial engagement of the clutch-cylinder 28 causes the fulcrum-lug 24 on the clutch-ring 22 to shift outwardly in its segmental slot 20, thus forcing the clutch-cylinder 27 into contact with the cylindrical clutch-face 15. Following this, the clutch-cylinder 28 rolls down its inclined seat 31 into its final locking or wedging position. During this sequence of actions, the starting load is gradually absorbed so that when final clutching takes place, the parts are not subjected to a sudden heavy shock.

To provide for maintaining the component parts of the clutch-mechanism in face-to-face cooperative relationship, the main-shaft 10 has secured thereon, by means of a set-screw 44 and the taper-pin 18, a retainer-collar 45 having its inner face contacting the outer face of the clutch-ring 22 (Fig. 2).

From the above description taken in connection with the accompanying drawings, it will be appreciated that I have perfected a clutch-mechanism of the type in question in which the clutching of the driving and driven members occurs at substantially diametrically opposite points thereby eliminating the binding of the driving member on the shaft upon which it is journaled. In addition, I have eliminated the accidental reclutching of the driving and driven members, in the event any slight rebound occurs as a result of the abrupt stopping of the operating machine parts. Also, I have perfected a clutch mechanism of the type in question which can be manufactured cheaply, primarily for the reason that a close tolerance is not required on the various parts in order for the clutch to operate satisfactorily.

While I have shown the coil-spring 37 to be relatively strong, it is so made only because of the load it must assume in suddenly stopping the machine. It will be appreciated that any weak spring having sufficient strength to shift the clutch-ring 22 relative to the clutch-member 16 to bring the clutch-cylinder 28 into contact with the internal clutch-face 15, would successfully operate to effect a clutching of the driving pulley 13 to the main-shaft 10. The final wedging action of the clutch-cylinders 27 and 28 is effected by the rotation of the driving pulley 13 and not by the coil-spring 37.

Having thus set forth the nature of the invention, what I claim herein is:

1. A clutch-mechanism comprising a driving member rotatable about an axis, a driven member, a clutch-element-carrying member pivotally supported on said driven member for movement about an axis spaced to one side of the axis of rotation of said driving member, a clutch-element sustained by said clutch-element carrying member at the other side of the axis of rotation of said driving member, a spring acting between said driven member and said clutch-element-carrying member for causing a relative shift between said two last named members to effect engagement of said clutch-element with said driving member, releasable means opposing effective action of said spring, and means effective in the clutch-release position of the clutch-element-carrying member for preventing reclutching of said clutch-element and said driving member upon rebound reverse rotation of said driven member.

2. A clutch-mechanism comprising a shaft, a driving member journaled on said shaft and having a cylindrical clutch-face, a driven member fast on said shaft and formed with a segmental slot, a clutch-element-carrying member provided with a fulcrum-lug and an abutment-lug, said fulcrum-lug being disposed in said segmental slot for cooperation therewith to provide a pivotal connection between said driven member and said clutch-element-carrying member, a plurality of clutch-elements interposed between the cylindrical clutch-face of said driving member and said clutch-element-carrying member, and a spring acting between said driven member and the abutment-lug on said clutch-element-carrying member for inducing a relative pivotal shift between said two last named members, thereby to urge said clutch-elements into engagement with said driving member.

3. A clutch-mechanism comprising a driving member having a cylindrical clutch-face, a driven member peripherally formed with a segmental slot, a clutch-element-carrying member provided with a fulcrum-lug and an abutment-lug formed with a cavity, said fulcrum-lug projecting into and cooperating with said segmental slot to provide a pivotal connection between said driven member and said clutch-element-carrying member, a clutch-element disposed in said cavity and located to cooperate with the cylindrical clutch-face of said driving member, means acting between said driven member and said abutment-lug for inducing a relative pivotal shift between said driven member and said clutch-element-carrying member for moving said clutch-element into clutching engagement with said driving member, declutching means for interrupting the clutching engagement of said clutch-element, and means providing clearance for said clutch-element and effective to eliminate accidental reclutching of the driving and driven members during any slight rebound of the driven member resulting from the operation of the declutching means.

4. The stop-mechanism as set forth in claim 3, in which the means operative to eliminate accidental reclutching of the driving and driven members during any slight rebound resulting from the operation of the declutching means, comprises having the bottom surface of the clutch-element cavity provided in said abutment-lug disposed to provide an increasing clearance in the direction of normal rotation of said driven member.

5. A clutch-mechanism comprising a driving member having a cylindrical clutch-face, a driven member formed with a segmental slot, a clutch-element-carrying member provided with a fulcrum-lug formed with a cavity and an abutment-lug also formed with a cavity, said fulcrum-lug projecting into and cooperating with said segmental slot to provide a pivotal connection between said driven member and said clutch-element-carrying member, a clutch-element disposed in each of said cavities formed in said clutch-element-carrying member and located to cooperate with the cylindrical clutch-face of said driving member, and a spring acting between said driven member and said abutment-lug for causing a relative pivotal shift between said driven member and said clutch-element-carrying member, thereby to urge said clutch-elements into engagement with said driving member.

6. A clutch-mechanism comprising coaxially disposed driving and driven rotary clutch-members, one of said clutch-members having an annular recess providing a cylindrical clutch face concentric therewith, a carrier-member pivotally mounted upon the other one of said clutch-members for swinging movement about an axis parallel to the common axis of rotation of said clutch-members, clutch-elements carried by said carrier-member at opposite sides of the rotation axis of said carrier-member and disposed for engagement with said cylindrical clutch-face, and spring means inducing swinging movement of said carrier-member in a direction for effecting clutching engagement of said clutch-elements with said cylindrical clutch-face.

7. A clutch-mechanism comprising a rotary driving member having a cylindrical clutch-face, a rotary driven member, a carrier member pivotally mounted upon said driven member for swinging movement and having a plurality of clutch-element receiving cavities adjacent said cylindrical clutch-face, one of said cavities having a face opposed to and inclined away from said clutch-face in the direction of rotation of said driving and driven members, clutch-elements disposed in said cavities, and spring means inducing swinging movement of said carrier-member in a direction for effecting clutching engagement of said clutch-elements with said cylindrical clutch-face.

EDWARD P. SPAINE.

REFERENCES CITED

The following references are of record in the file of this patent:

UNITED STATES PATENTS

| Number | Name | Date |
|--------|------|------|
| 503,311 | Dahl | Aug. 15, 1893 |
| 658,520 | Abel | Sept. 25, 1900 |
| 1,968,771 | Jex | July 31, 1934 |
| 2,072,852 | Batten et al. | Mar. 9, 1937 |